(12) United States Patent
McKinley et al.

(10) Patent No.: US 8,174,588 B1
(45) Date of Patent: May 8, 2012

(54) STEREO VIDEO MICROSCOPE

(76) Inventors: Harry R. McKinley, South Dartmouth, MA (US); Philip E. McKinley, Wesford, MA (US); John H. Dowling, Nashua, NH (US); Arthur Woodbury, Amherst, NH (US); Luis A. Figarella, Nashua, NH (US)

( * ) Notice: Subject to any disclaimer, the term of this patent is extended or adjusted under 35 U.S.C. 154(b) by 1507 days.

(21) Appl. No.: 11/626,339

(22) Filed: Jan. 23, 2007

Related U.S. Application Data

(60) Provisional application No. 60/761,866, filed on Jan. 25, 2006.

(51) Int. Cl.
*H04N 5/262* (2006.01)
*G02B 21/00* (2006.01)

(52) U.S. Cl. ..................... 348/240.3; 359/368
(58) Field of Classification Search ............ 348/51, 348/240.3; 359/368, 369
See application file for complete search history.

(56) References Cited

U.S. PATENT DOCUMENTS

| | | | | |
|---|---|---|---|---|
| 4,787,734 | A * | 11/1988 | Matsumura ................... | 351/212 |
| 6,816,304 | B2 * | 11/2004 | Nakamura et al. ............ | 359/388 |
| 7,224,535 | B2 * | 5/2007 | Neil .............................. | 359/683 |
| 7,911,689 | B2 * | 3/2011 | Kuroda et al. ................ | 359/368 |

* cited by examiner

*Primary Examiner* — Yemane Mesfin
(74) *Attorney, Agent, or Firm* — Luis Figarella

(57) ABSTRACT

An optical apparatus relates to the field of optical magnification and stereoscopy, more specifically to the problem of optically magnifying an area stereoscopically and displaying this information to an operator in a comfortable manner.

4 Claims, 7 Drawing Sheets

STEREO VIDEO MICROSCOPE

FIELD OF THE INVENTION

The present invention generally relates to the field of optical magnification and stereoscopy, and more specifically relates to the problem of optically magnifying an area stereoscopically and displaying this information to an operator.

DESCRIPTION OF THE RELATED ART

Traditional microscopes are purely optical-path devices. The scene in one end, is conveyed through optics to the other end, where the user or operator views it. Typically, this viewing is accomplished directly, that is, the operator looks directly at the microscope eyepieces. In the past 50 years, video cameras have been fitted to microscopes, in order to convey a facsimile of the image being observed. These cameras typically convey a mono-scopic image.

In situations where depth perception is important, the microscopes are designed to take spatially separated images of the target, creating a stereoscopic effect in the magnified image that is similar to that of humans. That is, the left and right eye view images from a slightly separated point of view, conveying a sense of depth. These microscopes are termed stereoscopic, and care must be taken with them to ensure that the perceived image is felt as "natural" to its human operators.

Generating stereoscopic video from these units is significantly harder than fitting a camera to each optical path, as care must be taken to ensure the images perfectly match each other, and remain so through the lifetime of the device.

While not critical to all microscope applications, the ability to capture and display both stills and video containing highly magnified images with depth information is critical to all applications where distance judgement is important. For this reason, whereas most microscopes are fitted with a mono-scopic camera, few are adapted to generate stereoscopic video. This forces operators of microscopes (such as dentists or ophthalmologists) to work off the direct optical path, not off the video monitor like their counterparts in many laparoscopic procedures.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The stereoscopic video microscope (SVM) system described here, allows operators to work off a stereoscopic display. The makes the SVM an electronic imaging system that replicates the utility of the stereoscopic optical-path stereo microscope, but by does so by bringing the image of interest to the operator through an electronic interface.

By operating with a myriad of stereoscopic displays, including but not limited to monitors, flat panels, head mounted displays, and projectors, the SVM finally allows the decoupling of the stereoscopic image capture from the stereoscopic image display. This allows for many advantages in applications such as surgery, inspection, repair and any other where high magnification and depth perception are a must.

This decoupling is one of the primary advantages of the electronic interface of the SVM vis-à-vis the optical path of traditional microscopes. In effect, the image capture portion of the system becomes a movable entity that may be positioned anywhere, with the display portion of the device being another entity, that may also be positioned anywhere, and replicated infinitely. The above may be accomplished via wired or wireless interfaces, at distances of inches, feet or miles (for example in tele-surgery).

In contrast, optical path microscopes require the eyepieces to be located near the eyes of the operator, and the area imaged near the limit of his/her reach. If observer tubes are required, then the amount of light on the subject must be increased for each observer, and care must be taken that the optical path does not degrade the image quality.

The SVM is not a camera to be attached to a microscope, but a complete stereoscopic microscope on its own. It contains the optics to image the area of interest, focus and vary its magnification (zoom) within specified parameters, electronically. This allows for the construction of a rugged unit better suited to the day to day handling in many applications. It also contains the illumination necessary to light the area of interest.

Other features and advantages of the present invention will become apparent upon examining the following detailed description of an embodiment thereof, taken in conjunction with the attached drawings.

DETAILED DESCRIPTION OF THE PREFERRED EMBODIMENT

For the purposes of this invention, the operator is the individual or group who gains value or insight by controlling and/or observing the system. This may include an individual or team of surgeons, dentists, nurses, students or observers (as well as their combination). In addition, while in the preferred embodiment these are co-located in nearby rooms, an alternative embodiment may have the procedure or procedures performed under tele-presence or robotic conditions. An operator may also make an arrangement to use the output of the SVM as the input to a computer or image processing system.

Figure 1:
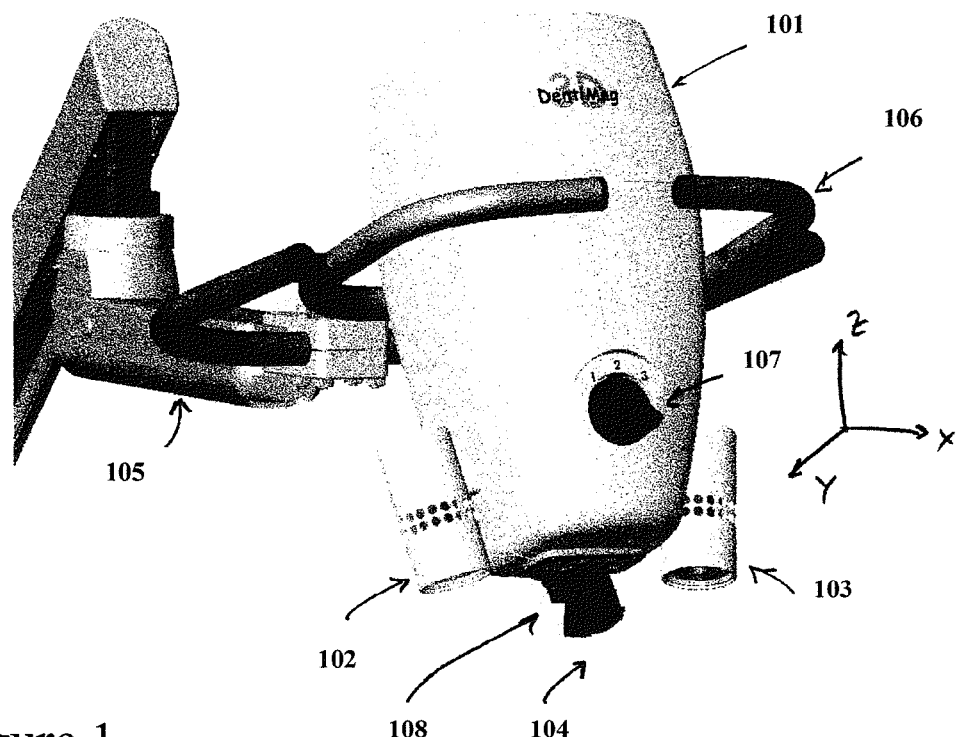
FIG. 1 shows an isometric view of the SVM camera head.

The Stereo Video Microscope (SVM) allows for the capture, transmission and display of stereoscopic images that may be still or motion. FIG. 1 illustrates the component of the system that performs the capture and transmission function, the camera head 101. While the preferred embodiment envisions live applications, it becomes trivial for those skilled in the art to envision alternative embodiments where the image output of the system is used in recording and replaying images for training or educational purposes.

This unit comprises a built-in continuous zoom optical system, integrated illumination sources 102, 103 and 104, image capture and display circuitry, and motors and circuitry to provide complete camera head movement (for fine focus). In addition, the unit also contains electronic interfaces to its base station and other devices (including interfaces to 3D display, pedals and buttons for system control and configuration).

In the preferred embodiment, the unit is mounted on a mechanical arm 105 that allows it to be positioned by the operator in whatever position is most advantageous for the task at hand. To assist in this, a gimbal-like assembly providing at least two axes of rotation is preferred 106. While the preferred embodiment is for this translation to occur under human power, alternative embodiments may include motorized X-Y-Z axis motion under user control.

Certain operations may require the illumination to be spectrally limited. In these cases, the inclusion of a user-controlled optical filters that may be brought in/out of the central 104 light source path via an external knob 107. This central light source is internal to the housing, and placed so that it is co-axial to the optical axes. In addition, certain operations may require the concentration of the beam of light into a smaller area (whether in combination with a spectral filter or separately), and for these an optical light concentrator that can be positioned within 108 or outside the light path 701 is included.

Figure 2:
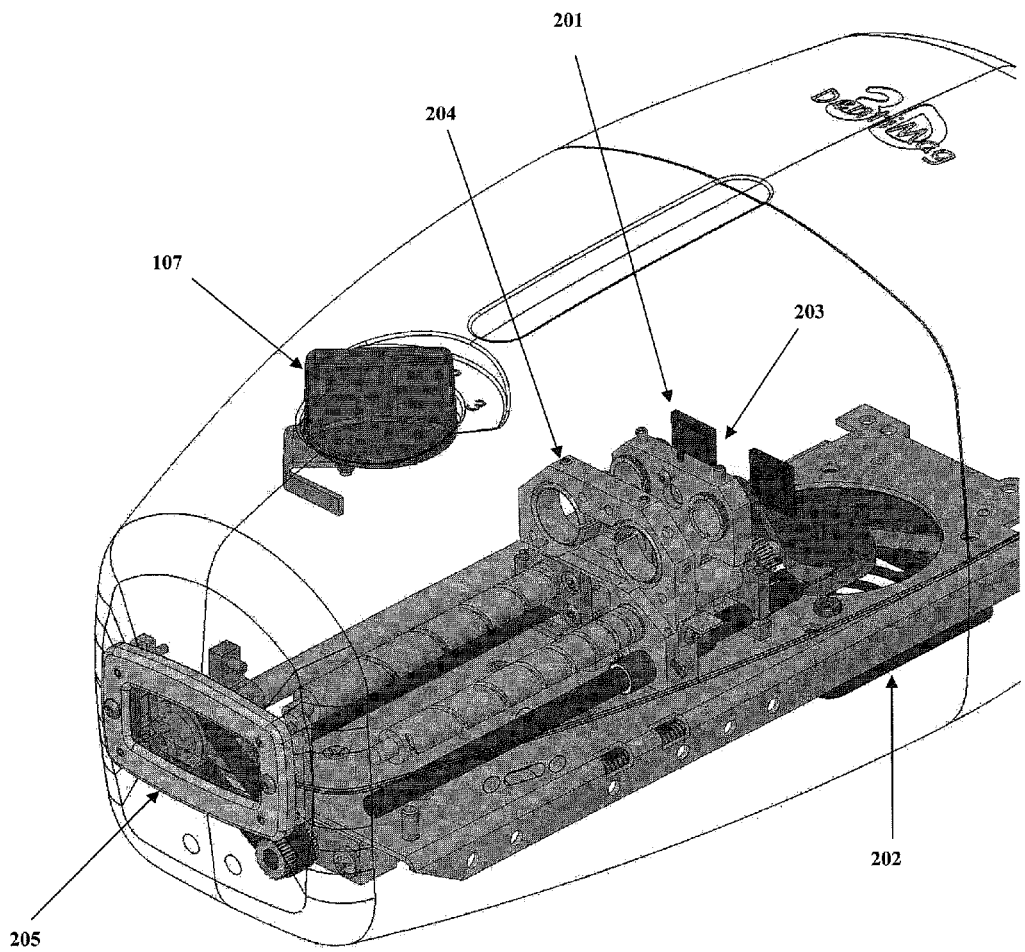
FIG. 2 shows a cut-away of the camera head body.

FIG. 2 illustrates the interior of the camera head. The image acquisition components reside inside it. These include the image acquisition sensors 201, 202, as well as the continuous zoom optics components within the lens carriers 203, 204, the image enters via the front opening 205, and travels via the parallel optical paths formed by the optics in the lens carriers 203, 204 until reaching the sensors 201, 202. Like optical stereo microscopes, the SVM utilizes optics to convey appropriately matched and spatially separated images (in order to correctly replicate the human stereoscopic experience) via separate side-by-side optical channels. The major difference is that in the SVM, there is no direct optical path for the user to view, instead all imaging is converged on the electronic sensors 201, 202.

These electronic sensors are each typically an area array of individual light capture elements, commonly referred to as camera pixels. In the preferred embodiment, these camera pixels are typically arranged in an RGB Bayer pattern, a definition well known to those skilled in the art. However, other common arrangements, such as a CYM (Cyan/Yellow/Magenta) Kodak pattern may also be used. In addition, we do not mean to imply that only individual color arrangements are possible. Vertical filter arrangements such as those described by Merrill, U.S. Pat. No. 6,935,050, would be sufficient to embody the present invention. In addition, it may be possible in an alternative embodiment to perform the above function with a single sensor whose area is divided into a left and right side for the respective sensor perspective.

Figure 3:
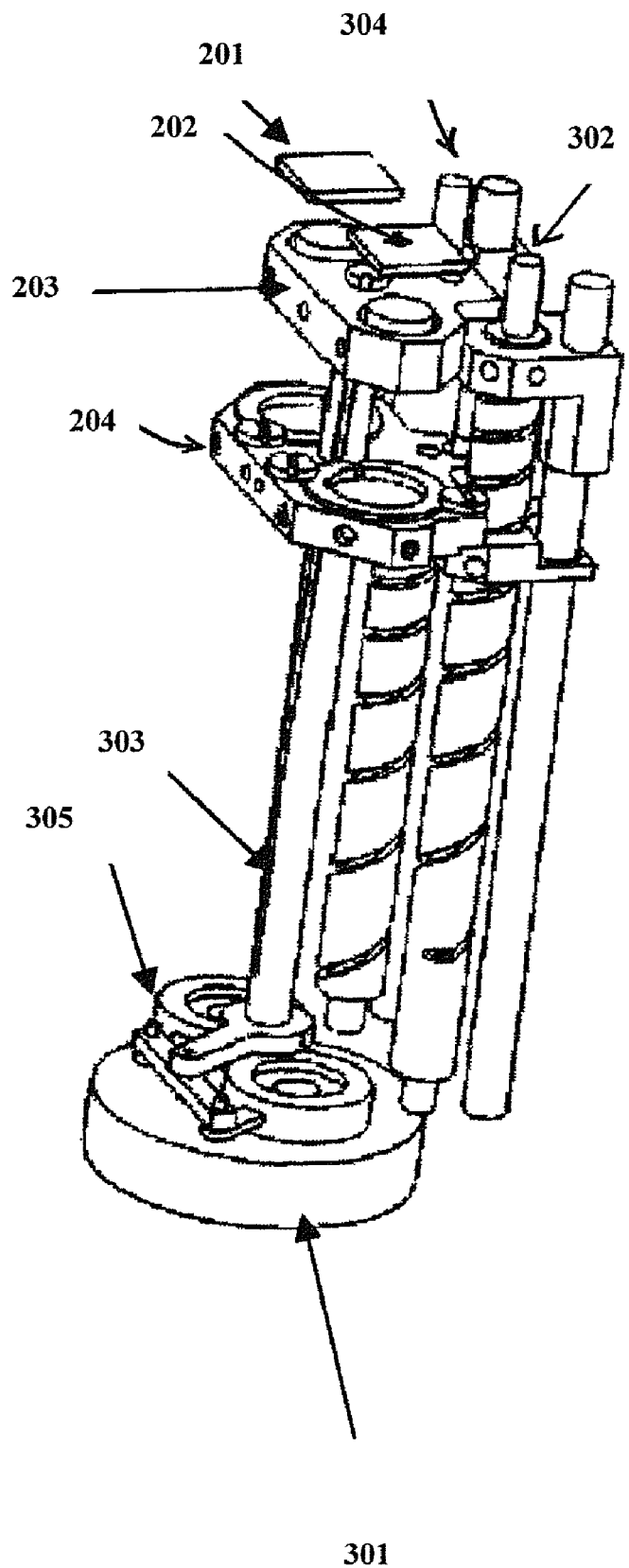
FIG. 3 shows details of the continuous zoom optical train mechanism when the magnification is at its minimum.
Figure 4:
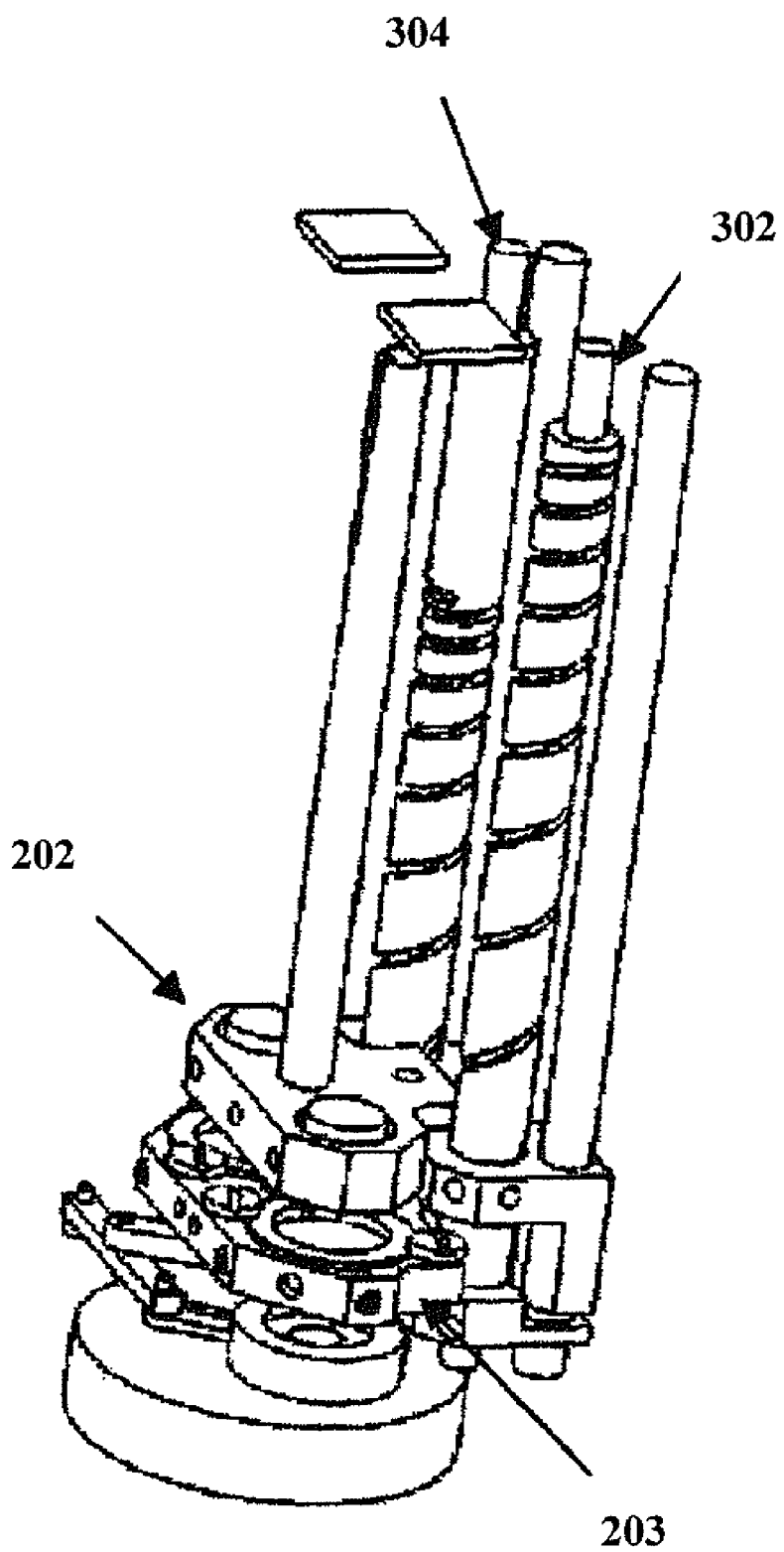
FIG. 4 shows details of the continuous zoom optical train mechanism when the magnification is at its maximum.

To zoom in/out of the image, the continuous zoom mechanism in front of the image sensors adjusts the relative position of the two optical lens carriers 203, 204. FIGS. 3 and 4 illustrate the two extreme positions of the lens carriers. These are required to move the system from maximum to minimum magnification. Each lens carrier is controlled by its individual cam. In this way, the position of lens carrier 203 is dependent on the rotation of cam 302, via the groove created on the cam. Similarly, lens carrier 204 is positioned by rotating cam 304. This creates a continuous relationship between the two that is controlled by the rotation of the cams. In the preferred embodiment this rotation is accomplished by the use of DC motors under the control of the system controller, although other means of locomotion may be used.

FIG. 3 illustrates the mechanical details of the system when the optics are at the lowest magnification (widest field-of-view). The left and right image coming into the system will first encounter a single collimator lens 301, common to both optical paths.

Because of the varying magnification, the system optical speed (referred to as the f-number, roughly speaking the amount of light allowed to go through the optical system) will be inversely proportional to the magnification of the system, and significantly different depending on whether the system is zoomed to 8× or 32×. The user, however, would prefer seeing an image that does not vary in brightness as the zoom function occurs. A set of variable irises (again, one per optical path) 305, are mounted at the beginning (front) of the optical train, and control the amount of light allowed into the system. The cam 303 simultaneously moves the iris position for both optical paths, according to the position of the rear lens carrier 203. The groove carved into the cam causes it to rotate as the lens carrier moves, effecting the iris position movement. In this fashion, the amount of light reaching the sensors 201, 202 is constant, giving the system a constant system f-number.

The movement of the lens carriers along the optical path (as well as with respect to each other), modifies the image by magnifying it at the sensors. In the preferred embodiment, this is done at 3.6× (although other combinations are possible). This gives the system a 10-mm to 36-mm field-of-view swing, resulting on an 8.9× to 32× overall magnification factor when viewed on a 17-inch CRT display.

Figure 5:
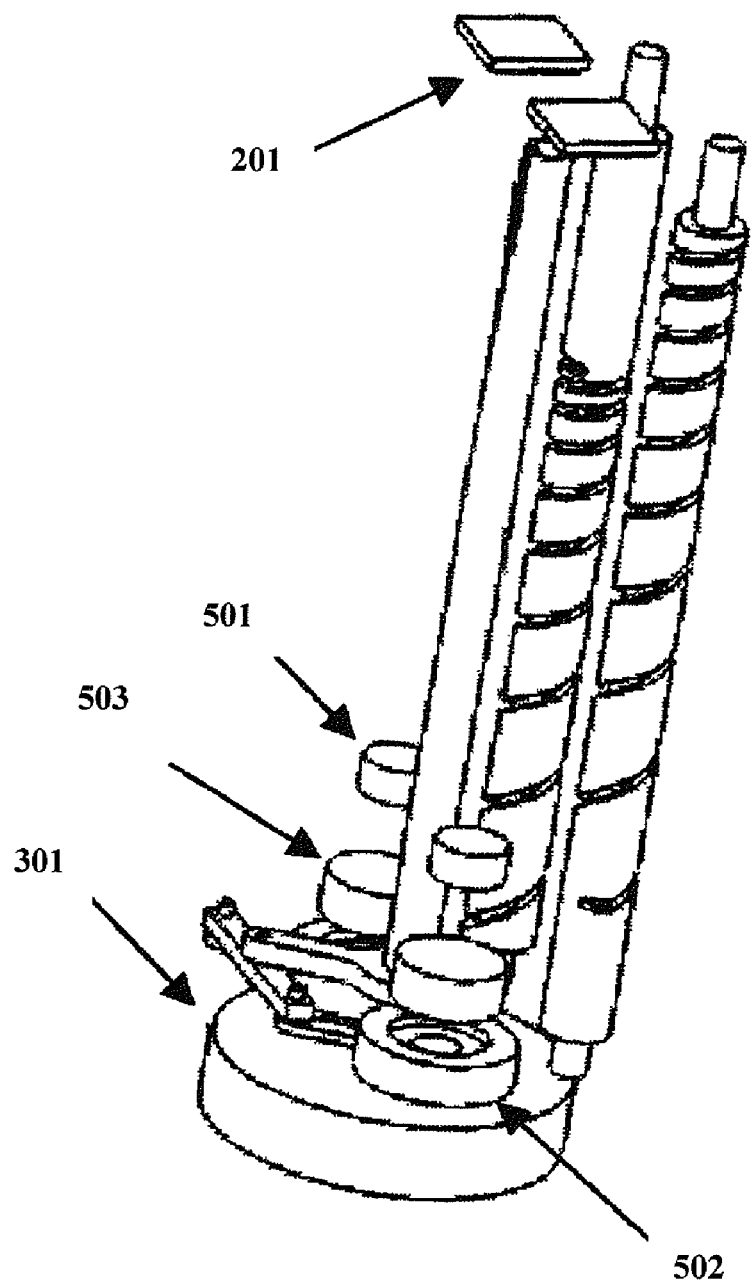
FIG. 5 shows details of the continuous zoom optical train with the optical lens carriers removed.

FIG. 4 illustrates the zoom system at the other end of magnification (when compared to FIG. 3). This is when the system is at its highest magnification (and provides the smallest field-of-view). The system got to this position by having the lens carriers 202, 203 travel from the "back" to the "front". The two lens carriers must move precisely along the axis, as well as relative to each other. To accomplish this, the zooming cams 302, 304 are moved simultaneously by a zoom motor. However, since the movement of both carriers is not identical, the precise grooves in cams are different. The path of the groove in Cam 302 controls the back lens carrier 202, while the path of the groove on cam 304 controls the position of the front lens carrier 203. Their position along the path generates the correct magnification factor for the continuous zoom motion. FIG. 5 illustrates the optical components of the system, minus the mechanical lens carriers (Hence the lenses are "floating" in space). It should be noted that within each pair of left/right lenses, the lenses used are the same. The collimator lens 301 in front is common to both optical paths. This lens functions in a manner similar to that explained in McKinley, U.S. Pat. No. 6,219,182.

The variable irises 502 represent the beginning of the separate left/right optical channels. Each lens in the front optical lens pair 503, held by the front lens carrier is an achromatic lens. Each lens in the back lens pair 501 held in the back lens carrier is a negative doublet. At the back of the system reside the image capture sensors 201.

Figure 6:
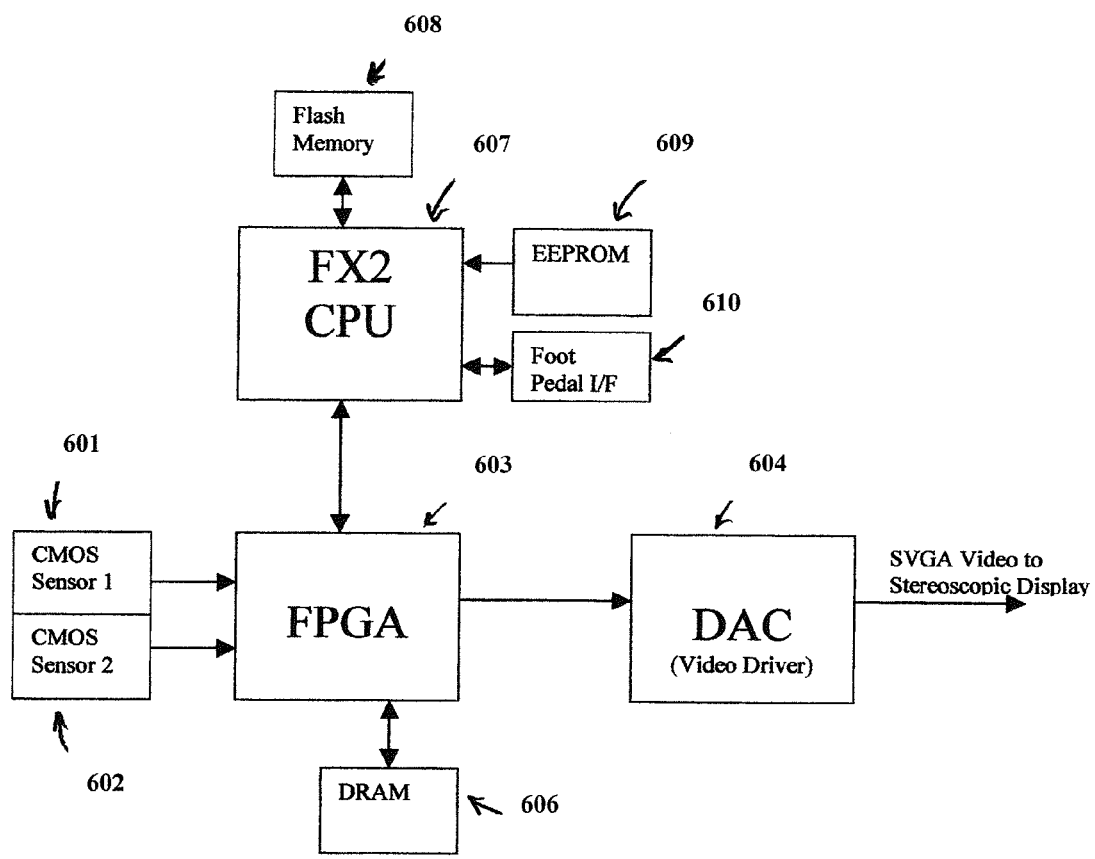
FIG. 6 details the electronic components block diagram
Figure 7:
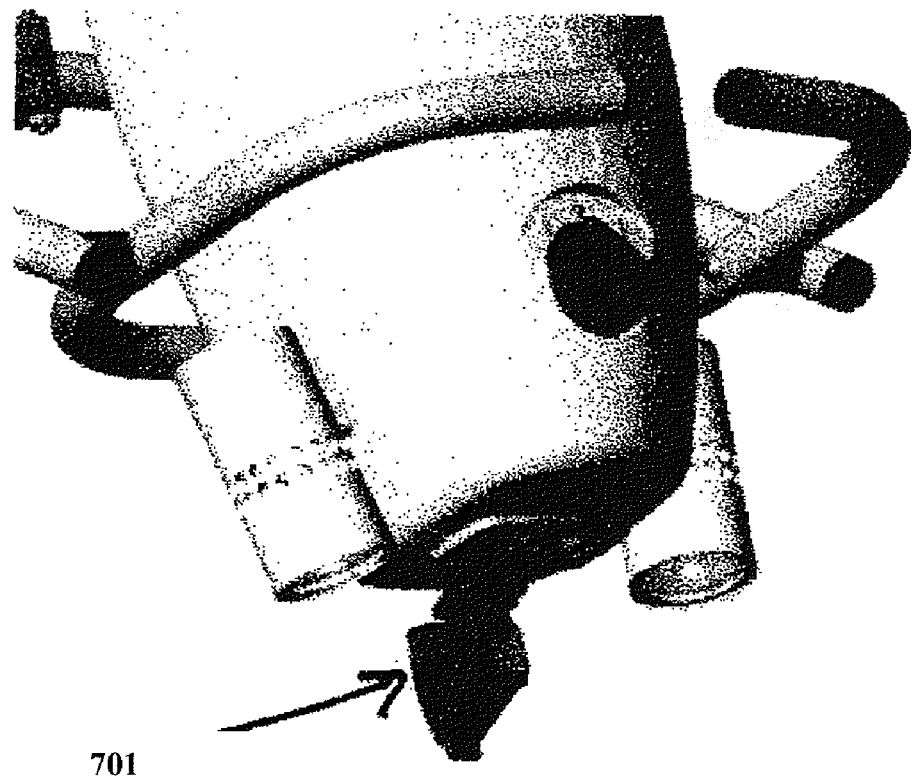
FIG. 7 shows the external light concentrator in the off position.

Once the image is presented to the image sensors via the optics, the system electronics prepare the image to be displayed to a stereoscopic display. The process by which this happens is best illustrated by referring to FIG. 6. In the preferred embodiment, these electronics are located in three primary Printed Circuit boards (PCB's) located in the camera head housing 101, although their location will change as electronic advances make further and further miniaturization possible. These PCBs connect electrically to an external interface box, which in place connects electrically to the user interface tools. These may include a foot pedal, hand pendant, interface to separate computer systems, display devices and many other industry standard interfaces. The electronics described in FIG. 6 run the software that allow the SVM to focus, zoom, illuminate, capture and display the stereoscopic images. The external interface box is a connection hub for all the various control signals, possessing no software executing components.

In the preferred embodiment, the unit's Cypress FX2 microprocessor 607 contains the primary routines, all written in 'C', executing on the system directly, without any operating system. The FX2 boots off the EEPROM code contained in 609, running this software, the FX2 then programs the Field Programmable Gate Array (FPGA) 603 using the data resident in the Flash memory module 608. In addition, the FX2 is also capable of interfacing with external computer systems via interfaces such as the Universal Serial Bus (USB), as well as taking user inputs via interfaces such as the Foot Pedal Interface 610, and/or teaching pendants driven by the user.

The FPGA does the image manipulation and processing intensive duties, specifically those involved in capturing the images from the CMOS sensors 601, 602, and formatting it for display via the Digital to Analog converter (DAC) 604. Unlike the captured image (which is made of individual RGB pixel values), the displayed image is made of combined RGB pixel values. That is, the display pixels contain a value for its red component, one for its green component and one for its blue component. For example, if the image capture is done with 800×600 pixel sensors, a Super Video Graphics Array (SVGA) output (a common computer display) will be formed by mathematically calculating the area contribution of the neighboring pixels. That is, the 800×600 output will be made of 800×600 combined pixels, where each pixel contains a value of red, green and blue.

Creating this display pixel is a mathematical calculation, which may be done in many ways. A simple one is to read the neighbor pixel values, and multiply them by separate red, green and blue gains. This is typically done by way of bi-linear interpolation. The FPGA uses a DRAM block 606 to store/retrieve parameters such as these during this operation Some FPGAs require reprogramming when the power is removed from the system. In the preferred embodiment, the FX2 CPU 607 must reprogram it again when power is lost. The DAC is responsible for driving the SVGA format signal the user ultimately sees on their choice of 3D display.

Overall, in the preferred embodiment, the system runs a boot-up portion, when the above is accomplished. It then remains in a continuous sample loop looking for commands related to focus, zoom or light. Shut-down is accomplished when the system is turned off.

In the preferred embodiment, a number of features are controlled by the running of this continuous loop. Among them, the motorized fine focus function. Coarse focus is accomplished by the operator moving the unit manually, which is sufficient for small magnification levels. As the image magnification increases, the laws of optics apply, and the system requires fine adjustment of the imaging distance to accomplish optical focus. In the preferred embodiment, the system accomplishes this by moving the entire image head housing, closer or farther from the patient. In the preferred embodiment, the optics of the system are designed to operate 500 mm from the patient, and the maximum range of motion via the fine focus mechanism is 88 mm, making it impossible for the unit to contact the patient inadvertently.

The movement described above is accomplished via the movement of a powered fine focus screw connected to a 12V DC motor. This motor's speed and direction of motion is directly controlled by the FX2 microprocessor 607. When the surgeon commands movement (closer or farther, depending on whether he presses the focus pedal left or right 610), the microprocessor sees the desire for movement (and direction) signal, and proceeds to execute a move that way. The monitoring routine continues to move the motor until the signal from the surgeon "to move" ceases (i.e. the pedal is not pressed any longer), or the mechanical limit of travel is reached.

Zoom level variation (magnification) is accomplished by moving the system optics, residing on the lens carriers 203, 204 relative to each other. The movement of the motors controlling the zoom is commanded by the FX2 CPU 607 response to external user inputs (such as those on the foot pedal 610).

The decoupling of the image capture from the image display is central to the utility of the invention, and allows for a number of advantages over optical-path microscope units. Some of these include the ability to digitally zoom beyond the optical zoom characteristics of the system by selecting for display any particular portion of the electronic image. These are well documented in other applications.

However, central to the stereoscopic uniqueness of this unit, we could perform stereoscopically centric manipulations. One of these is the ability to temporarily enhance the stereo window effect (the perception of how far something "jumps" off the screen) when viewing particular scenes. We would do this by electronically moving the center of the image within each separate image sensors 201, 202 in combination with the formatting of the image in the unit's FPGA 603. In effect, we adjust "on the fly" your perceived interpupillary distance of the image. This magnifies your sensed of depth (in effect it makes you believe your eyes are further separated). This electronic shifting of the image within the sensor imaging area is integral to the actual manufacturing of the units. In effect, it allows for the independent adjustment of each sensor to the respective optical paths created by the assembly tolerances of the lenses within the lens carriers in each respective axis. By means of this control, we can proceed to "center" each sensor to its respective manufactured optical axis, without needing to readjust the lenses.

Similarly, unlike direct path systems, we can artificially adjust the color, gain, gamma of each image (together or separately), providing image enhancements not available to traditional optical-path systems.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A variable zoom stereo video optics assembly having a front and a back comprising;
    a front collimating lens;
    a left iris having a variable aperture;
    a right iris having a variable aperture;
    a pair of linear motion support rails having a length from said front to said back;
    a front lens carrier moveably mounted to said pair of linear motion support rails and mounted therein a left front lens and a right front lens, said left front lens and said right front lens being the same;
    a back lens carrier moveably mounted to said pair of linear motion support rails and mounted therein a left back lens and a right back lens, said left back lens and said right back lens being the same;
    a left image sensor positioned behind a left optical path formed by said front collimating lens, said left iris, said left front lens and said left back lens;
    a right image sensor positioned behind a right optical path formed by said front collimating lens, said right iris, said right front lens and said right back lens;
    a first cam to independently move said front lens carrier along said pair of linear motion support rails according to a first groove function;
    a second cam to independently move said back lens carrier along said pair of linear motion support rails according to a second groove function different from said first groove function;
    a third cam and a means to change said variable apertures of said left iris and said right iris simultaneously and equally according to a third groove function different from said first and second groove functions; and
    a remotely controlled drive means that drives a coupling means that simultaneously and independently moves said front lens carrier according to said first groove function in said first cam while moving said rear lens carrier according to said second grove function in said second cam and changing said variable apertures of said left iris and said right iris according to said third groove function in said third cam.

2. The variable zoom stereo video optics assembly of claim 1 wherein;
    said front left lens and said front right lens are achromatic.

3. The variable zoom stereo video optics assembly of claim 1 wherein;
    said back left lens and said back right lens are negative doublets.

4. The variable zoom stereo video optics assembly of claim 1 wherein;
    said remotely controlled drive means consists of a foot switch and a motor.

* * * * *